US011950182B2

(12) United States Patent
Stojanovski et al.

(10) Patent No.: US 11,950,182 B2
(45) Date of Patent: Apr. 2, 2024

(54) NEGOTIATION OF A PC5 RAT FOR A V2X SERVICE

(71) Applicant: Apple Inc., Cupertino, CA (US)

(72) Inventors: Alexandre Saso Stojanovski, Paris (FR); Chang Hong Shan, Shanghai (CN); Meghashree Dattatri Kedalagudde, Hillsboro, OR (US)

(73) Assignee: Apple Inc., Cupertino, CA (US)

( * ) Notice: Subject to any disclaimer, the term of this patent is extended or adjusted under 35 U.S.C. 154(b) by 485 days.

(21) Appl. No.: 17/275,448

(22) PCT Filed: Sep. 24, 2019

(86) PCT No.: PCT/US2019/052708
§ 371 (c)(1),
(2) Date: Mar. 11, 2021

(87) PCT Pub. No.: WO2020/068835
PCT Pub. Date: Apr. 2, 2020

(65) Prior Publication Data
US 2022/0053415 A1    Feb. 17, 2022

Related U.S. Application Data

(60) Provisional application No. 62/735,705, filed on Sep. 24, 2018.

(51) Int. Cl.
*H04W 4/00*    (2018.01)
*H04L 5/00*    (2006.01)
(Continued)

(52) U.S. Cl.
CPC ........... *H04W 48/18* (2013.01); *H04L 5/0053* (2013.01); *H04W 4/40* (2018.02); *H04W 92/18* (2013.01)

(58) Field of Classification Search
None
See application file for complete search history.

(56) References Cited

U.S. PATENT DOCUMENTS

| | | | | |
|---|---|---|---|---|
| 2019/0274121 A1* | 9/2019 | Wu | ......................... | H04W 72/23 |
| 2019/0313469 A1* | 10/2019 | Karampatsis | ......... | H04W 76/14 |

FOREIGN PATENT DOCUMENTS

| | | |
|---|---|---|
| WO | 2018064068 A1 | 4/2018 |
| WO | 2018084880 A1 | 5/2018 |
| WO | 2018149265 A1 | 8/2018 |

OTHER PUBLICATIONS

CATT, "On LTE Uu and NR Uu Control NR Sidelink in NR V2X", 3GPP TSG RAN1 Meeting #94, R1-1808404, Aug. 11, 2018, Gothenburg, Sweden, 4 pgs.

(Continued)

*Primary Examiner* — Zewdu A Beyen
(74) *Attorney, Agent, or Firm* — Kowert, Hood, Munyon, Rankin & Goetzel, P.C.

(57) ABSTRACT

Embodiments of a User Equipment (UE) and methods of communication are generally described herein. The UE may be configurable to operate as an initiating UE for a vehicle-to-everything (V2X) application that includes PC5 communication between the initiating UE and a receiving UE. The initiating UE may receive, from a base station, control signaling that indicates a default PC5 radio access technology (RAT) for the V2X service. The default PC5 RAT may be either a Long Term Evolution (LTE) PC5 RAT or a New Radio (NR) PC5 RAT. Based on the default PC5 RAT and/or PC5 RATs supported by the initiating UE, the initiating UE may select either the LTE PC5 RAT or the NR PC5 RAT. The selected PC5 RAT may be proposed, in a negotiation with the receiving UE, for the V2X service.

20 Claims, 6 Drawing Sheets

(51) Int. Cl.
*H04W 4/40* (2018.01)
*H04W 48/18* (2009.01)
*H04W 92/18* (2009.01)

(56) References Cited

OTHER PUBLICATIONS

Intel Corporation, "Coexistence Mechanisms for eV2X Services", 3GPP TSG RAN WG1 Meeting #94, R1-1808702, Aug. 11, 2018, Gothenburg, Sweden, 7 pgs.
International Search Report and Written Opinion for International Application No. PCT/US2019/052708, dated Jan. 17, 2020, 7 pgs.

\* cited by examiner

NEGOTIATION OF A PC5 RAT FOR A V2X SERVICE

PRIORITY CLAIM

This application is a United States National Stage filing of International Application No. PCT/US2019/052708, filed Sep. 24, 2019, which claims the benefit of priority to U.S. Provisional Patent Application Ser. No. 62/735,705, filed Sep. 24, 2018, each of which is incorporated herein by reference in its entirety.

TECHNICAL FIELD

Embodiments pertain to wireless communications. Some embodiments relate to wireless networks including 3GPP (Third Generation Partnership Project) networks, and 3GPP LTE (Long Term Evolution) networks, Fifth Generation (5G) networks, and/or New Radio (NR) networks. Some embodiments relate to sidelink communication, PC5 communication, vehicle-to-vehicle (V2V) communication, vehicle-to-everything (V2X) communication, direct communication between mobile devices, and/or device-to-device (D2D) communication. Some embodiments relate to methods to negotiate a PC5 radio access technology (RAT) for a V2X service.

BACKGROUND

Efficient use of the resources of a wireless network is important to provide bandwidth and acceptable response times to the users of the wireless network. However, often there are many devices trying to share the same resources and some devices may be limited by the communication protocol they use or by their hardware bandwidth. Moreover, wireless devices may need to operate with both newer protocols and with legacy device protocols.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
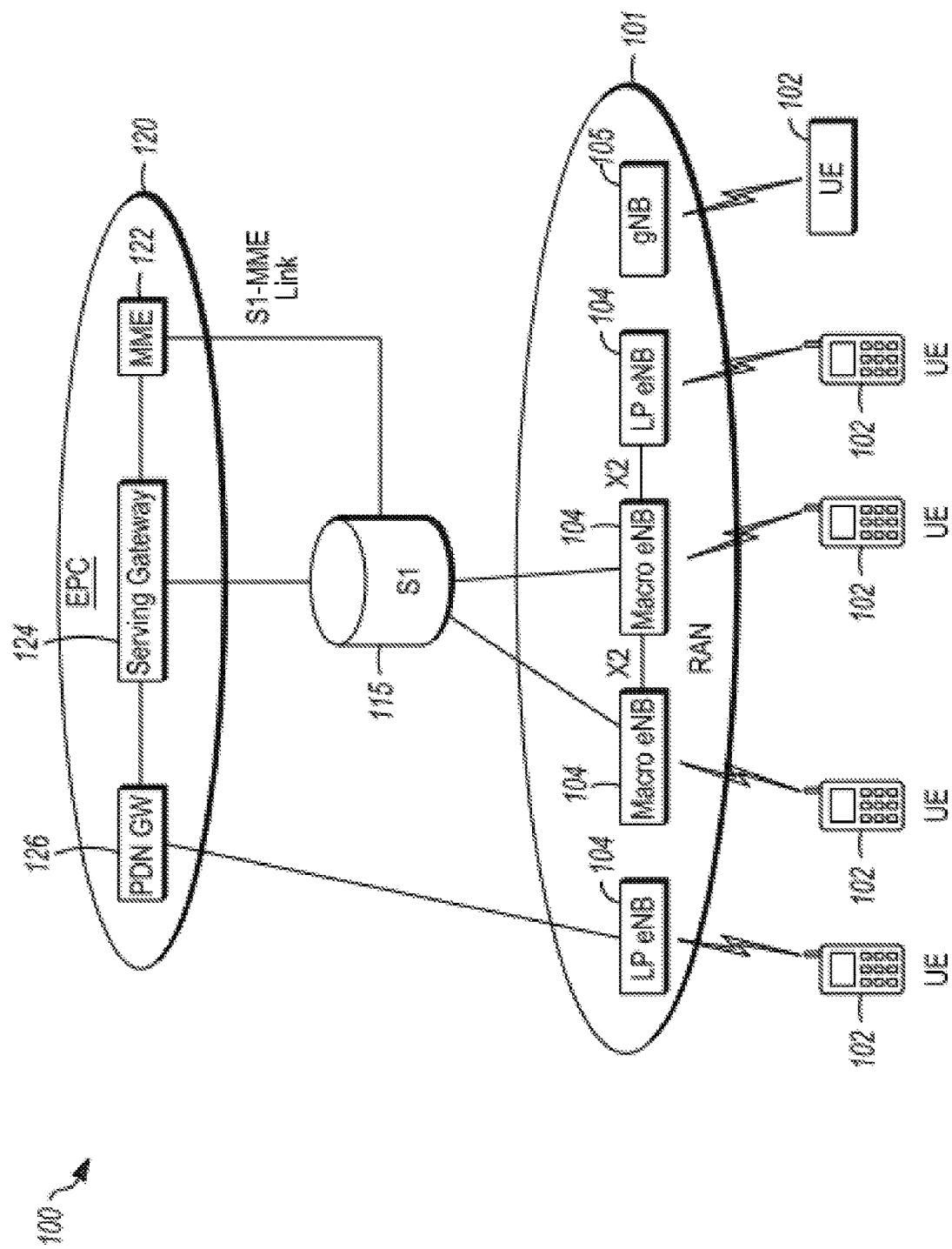
FIG. 1A is a functional diagram of an example network in accordance with some embodiments.
Figure 1B:
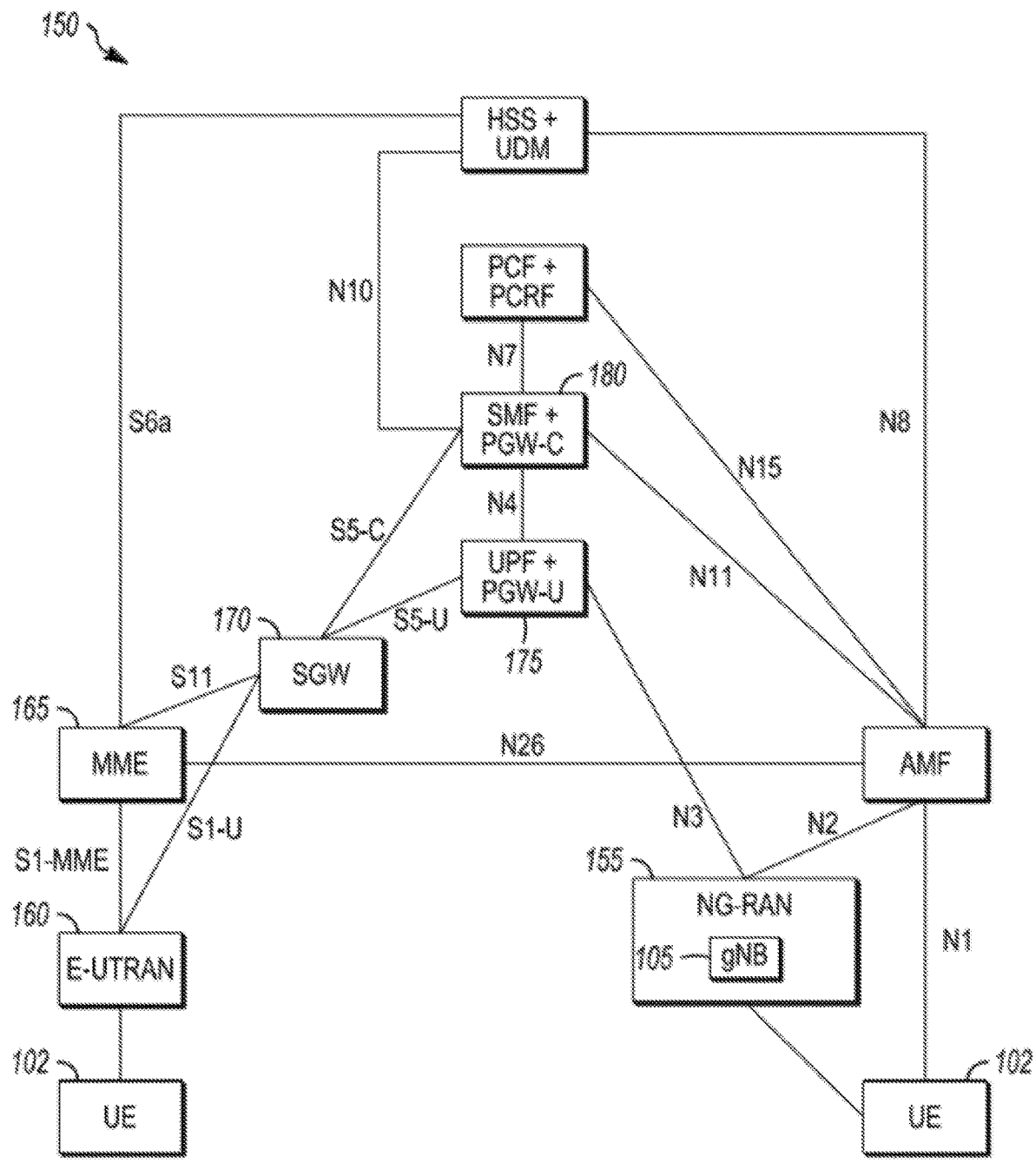
FIG. 1B is a functional diagram of another example network in accordance with some embodiments.

FIG. 1A is a functional diagram of an example network in accordance with some embodiments. FIG. 1B is a functional diagram of another example network in accordance with some embodiments. In references herein, "FIG. 1" may include FIG. 1A and FIG. 1B. In some embodiments, the network 100 may be a Third Generation Partnership Project (3GPP) network. In some embodiments, the network 150 may be a 3GPP network, a new radio (NR) network and/or Fifth Generation (5G) network. Other networks may be used in some embodiments. In some embodiments, a network may include one or more of: one or more components shown in FIG. 1A; one or more components shown in FIG. 1B; and one or more additional components. Some embodiments may not necessarily include all components shown in FIG. 1A and FIG. 1B.

The network 100 may comprise a radio access network (RAN) 101 and the core network 120 (e.g., shown as an evolved packet core (EPC)) coupled together through an S1 interface 115. For convenience and brevity sake, only a portion of the core network 120, as well as the RAN 101, is shown. In some embodiments, the RAN 101 may include one or more of: one or more components of an evolved universal terrestrial radio access network (E-UTRAN), one or more components of an NR network, and/or one or more other components.

The core network 120 may include a mobility management entity (MME) 122, a serving gateway (serving GW) 124, and packet data network gateway (PDN GW) 126. In some embodiments, the networks 100, 150 may include (and/or support) one or more Evolved Node-B's (eNBs) 104 and/or one or more Next Generation Node-B's (gNBs) 105. The eNBs 104 and/or gNBs 105 may operate as base stations for communicating with User Equipment (UE) 102. In some embodiments, one or more eNBs 104 may be configured to operate as gNBs 105. Embodiments are not limited to the number of eNBs 104 shown in FIG. 1A or to the number of gNBs 105 shown in FIG. 1B. Embodiments are also not limited to the connectivity of components shown in FIG. 1A.

In some embodiments, one or more UEs 102 may communicate with each other. In some embodiments, such communication may be based on one or more of: PC5, vehicle-to-vehicle (V2V), vehicle-to-everything (V2X), sidelink, device-to-device (D2D) and/or other.

It should be noted that references herein to an eNB 104 or to a gNB 105 are not limiting. In some embodiments, one or more operations, methods and/or techniques (such as those described herein) may be practiced by a base station component (and/or other component), including but not limited to a gNB 105, an eNB 104, a serving cell, a transmit receive point (TRP) and/or other. In some embodiments, the base station component may be configured to operate in accordance with one or more of: a 3GPP LTE protocol/standard, an NR protocol/standard, a Fifth Generation (5G) protocol/ standard; and/or other protocol/standard, although the scope of embodiments is not limited in this respect.

Descriptions herein of one or more operations, techniques and/or methods practiced by a component (such as the UE 102, eNB 104, gNB 105 and/or other) are not limiting. In some embodiments, one or more of those operations, techniques and/or methods may be practiced by another component.

The MME 122 manages mobility aspects in access such as gateway selection and tracking area list management. The serving GW 124 terminates the interface toward the RAN 101, and routes data packets between the RAN 101 and the core network 120. In addition, it may be a local mobility anchor point for inter-eNB handovers and also may provide an anchor for inter-3GPP mobility. The serving GW 124 and the MME 122 may be implemented in one physical node or separate physical nodes.

In some embodiments, UEs 102, the eNB 104 and/or gNB 105 may be configured to communicate Orthogonal Frequency Division Multiplexing (OFDM) communication signals over a multicarrier communication channel in accordance with an Orthogonal Frequency Division Multiple Access (OFDMA) communication technique.

In some embodiments, the network 150 may include one or more components configured to operate in accordance with one or more 3GPP standards, including but not limited to an NR standard. The network 150 shown in FIG. 1B may include a next generation RAN (NG-RAN) 155, which may include one or more gNBs 105. In some embodiments, the network 150 may include the E-UTRAN 160, which may include one or more eNBs. The E-UTRAN 160 may be similar to the RAN 101 described herein, although the scope of embodiments is not limited in this respect.

In some embodiments, the network 150 may include the MME 165, which may be similar to the MME 122 described herein, although the scope of embodiments is not limited in this respect. In some embodiments, the network 150 may include the SGW 170, which may be similar to the SGW 124 described herein, although the scope of embodiments is not limited in this respect.

Embodiments are not limited to the number or type of components shown in FIG. 1B. Embodiments are also not limited to the connectivity of components shown in FIG. 1B.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware. Embodiments described herein may be implemented into a system using any suitably configured hardware and/or software.

Figure 2:
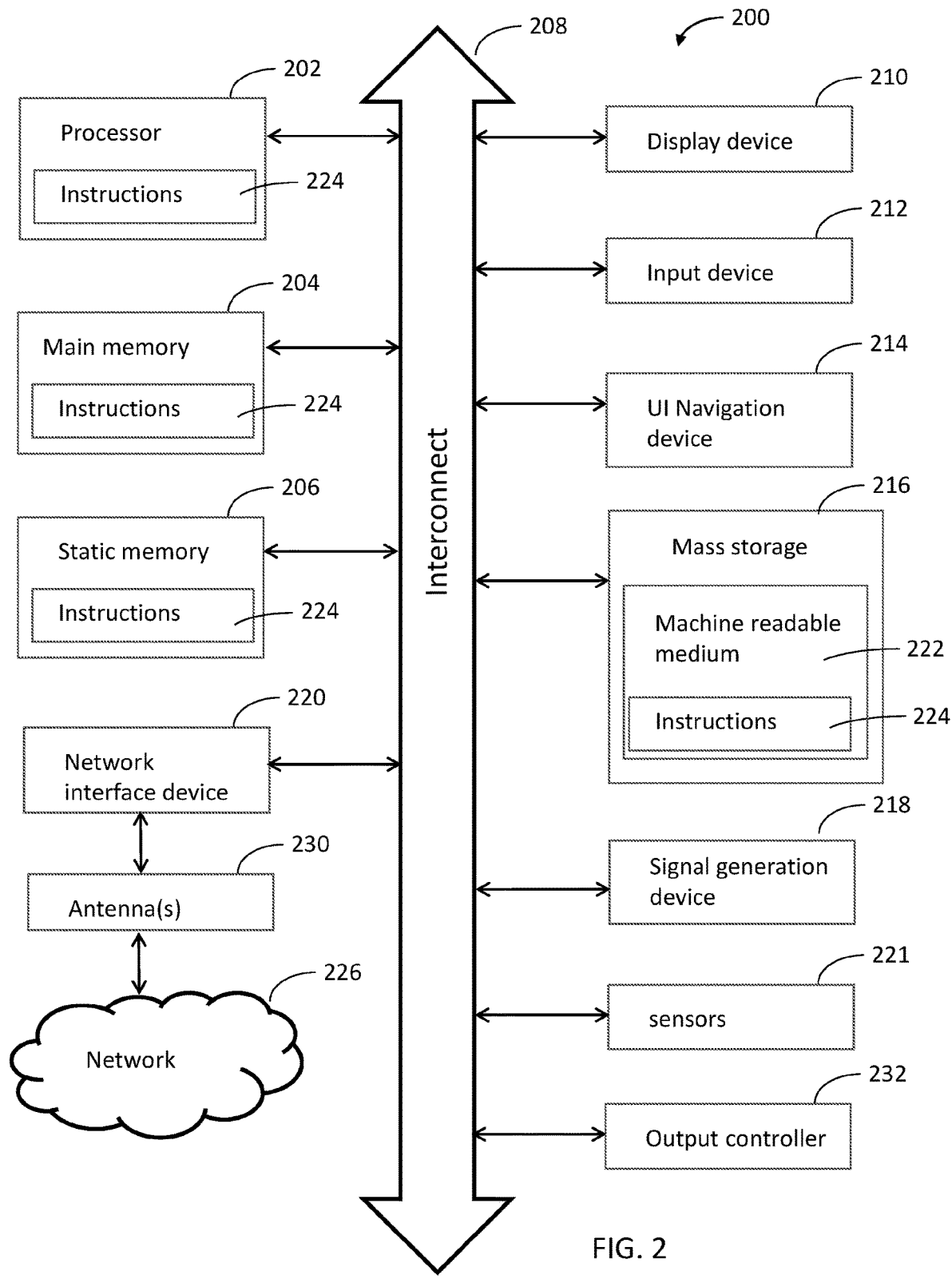
FIG. 2 illustrates a block diagram of an example machine in accordance with some embodiments.

FIG. 2 illustrates a block diagram of an example machine in accordance with some embodiments. The machine 200 is an example machine upon which any one or more of the techniques and/or methodologies discussed herein may be performed. In alternative embodiments, the machine 200 may operate as a standalone device or may be connected (e.g., networked) to other machines. The machine 200 may be a UE 102, eNB 104, gNB 105, access point (AP), station (STA), user, device, mobile device, base station, another device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples as described herein, may include, or may operate on, logic or a number of components, modules, or mechanisms.

The machine (e.g., computer system) 200 may include a hardware processor 202 (e.g., a central processing unit (CPU), a graphics processing unit (GPU), a hardware processor core, or any combination thereof), a main memory 204 and a static memory 206, some or all of which may communicate with each other via an interlink (e.g., bus) 208. The machine 200 may further include one or more of 210-228.

The storage device 216 may include a machine readable medium 222 on which is stored one or more sets of data structures or instructions 224 (e.g., software) embodying or utilized by any one or more of the techniques or functions described herein. The instructions 224 may also reside, completely or at least partially, within the main memory 204, within static memory 206, or within the hardware processor 202 during execution thereof by the machine 200. In an example, one or any combination of the hardware processor 202, the main memory 204, the static memory 206, or the storage device 216 may constitute machine readable media. In some embodiments, the machine readable medium may be or may include a non-transitory computer-readable storage medium. In some embodiments, the machine readable medium may be or may include a computer-readable storage medium.

While the machine readable medium 222 is illustrated as a single medium, the term "machine readable medium" may include a single medium or multiple media (e.g., a centralized or distributed database, and/or associated caches and servers) configured to store the one or more instructions 224. The term "machine readable medium" may include any medium that is capable of storing, encoding, or carrying instructions for execution by the machine 200 and that cause the machine 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 224 may further be transmitted or received over a communications network 226 using a transmission medium via the network interface device 220 utilizing any one of a number of transfer protocols. In an example, the network interface device 220 may include a plurality of antennas to wirelessly communicate using at least one of single-input multiple-output (SIMO), multiple-input multiple-output (MIMO), or multiple-input single-output (MISO) techniques. In some examples, the network interface device 220 may wirelessly communicate using Multiple User MIMO techniques. The term "transmission medium" shall be taken to include any intangible medium that is capable of storing, encoding or carrying instructions for execution by the machine 200, and includes digital or analog communications signals or other intangible medium to facilitate communication of such software.

Figure 3:
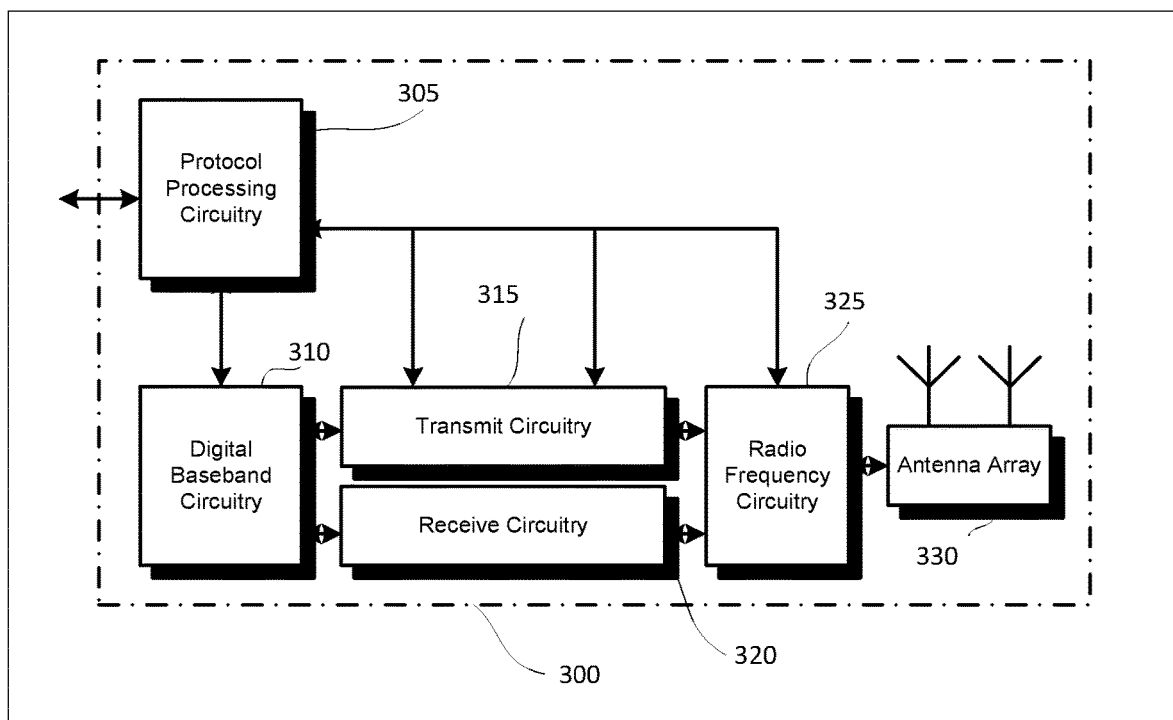
FIG. 3 illustrates an exemplary communication circuitry according to some aspects.

FIG. 3 illustrates an exemplary communication circuitry according to some aspects. It should be noted that a device, such as a UE 102, eNB 104, gNB 105, the machine 200 and/or other device may include one or more components of the communication circuitry 300, in some aspects. The communication circuitry 300 may include protocol processing circuitry 305, which may implement one or more of: medium access control (MAC), radio link control (RLC), packet data convergence protocol (PDCP), radio resource control (RRC) and non-access stratum (NAS) functions. The communication circuitry 300 may further include digital baseband circuitry 310, which may implement one or more physical layer (PHY) functions. The communication circuitry 300 may further include transmit circuitry 315, receive circuitry 320 and/or antenna array circuitry 330. The communication circuitry 300 may further include radio frequency (RF) circuitry 325. In an aspect of the disclosure, RF circuitry 325 may include multiple parallel RF chains for one or more of transmit or receive functions, each connected to one or more antennas of the antenna array 330.

In some embodiments, processing circuitry may perform one or more operations described herein and/or other operation(s). In a non-limiting example, the processing circuitry may include one or more components such as the processor 202, protocol processing circuitry 305, digital baseband circuitry 310, similar component(s) and/or other component(s).

In some embodiments, a transceiver may transmit one or more elements (including but not limited to those described herein) and/or receive one or more elements (including but not limited to those described herein). In a non-limiting example, the transceiver may include one or more components such as transmit circuitry 315, receive circuitry 320, radio frequency circuitry 325, similar component(s) and/or other component(s).

Although the UE 102, eNB 104, gNB 105, machine 200 and/or other device described herein may each be illustrated as having several separate functional elements, one or more of the functional elements may be combined and may be implemented by combinations of software-configured elements, such as processing elements including digital signal processors (DSPs), one or more microprocessors, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

It should be noted that in some embodiments, an apparatus of the UE 102, eNB 104, gNB 105, machine 200, and/or other device may include various components shown in FIGS. 2-3 and/or other components. Accordingly, techniques and operations described herein that are performed by a device may be performed by an apparatus of the device, in some embodiments.

In accordance with some embodiments, the UE 102 may be configurable to operate as an initiating UE 102 for a vehicle-to-everything (V2X) application that includes PC5 communication between the initiating UE 102 and a receiving UE 102. The initiating UE 102 may receive, from a base station, control signaling that indicates a default PC5 radio access technology (RAT) for the V2X service. The default PC5 RAT may be either a Long Term Evolution (LTE) PC5 RAT or a New Radio (NR) PC5 RAT. The initiating UE 102 may select either the LTE PC5 RAT or the NR PC5 RAT to be proposed, in a negotiation with the receiving UE 102, for the V2X service. The initiating UE 102 may, if the initiating UE 102 supports at least the default PC5 RAT, select the default PC5 RAT. The initiating UE 102 may, if the initiating UE 102 does not support the default PC5 RAT: of the LTE PC5 RAT and the NR PC5 RAT, select the PC5 RAT that is supported by the initiating UE 102; and transmit, to the receiving UE 102, a PC5 Radio Access Technology (RAT) request message to initiate the V2X service. The PC5 RAT request message may indicate the selected PC5 RAT. These embodiments are described in more detail below.

Figure 4:
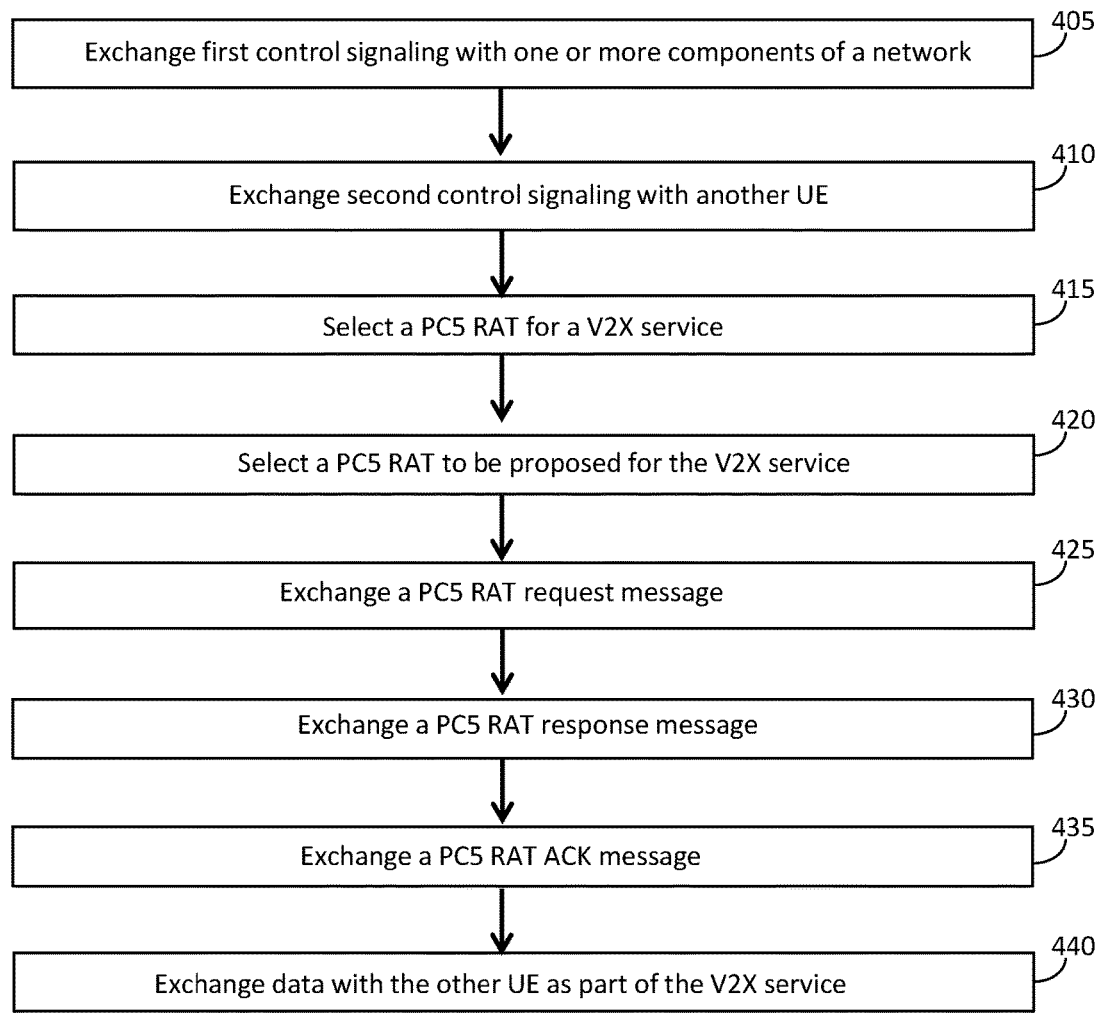
FIG. 4 illustrates the operation of a method of communication in accordance with some embodiments.

FIG. 4 illustrates the operation of a method of communication in accordance with some embodiments. Embodiments of the method 400 may include additional or even fewer operations or processes in comparison to what is illustrated in FIG. 4. Embodiments of the method 400 are not necessarily limited to the chronological order that is shown in FIG. 4.

In some embodiments, a UE 102 may perform one or more operations of the method 400, but embodiments are not limited to performance of the method 400 and/or operations of it by the UE 102. In some embodiments, a device and/or component (including but not limited to the UE 102, gNB 105 and/or eNB 104) may perform one or more operations that may be the same as, similar to, reciprocal to and/or related to an operation of the method 400.

Discussion of various operations, techniques and/or concepts regarding one method described herein (such as the method 400 and/or other) may be applicable to other operations described herein and/or other methods described herein. One or more of the techniques, operations and/or methods described herein may be performed by a device other than an eNB 104, gNB 105, and UE 102, including but not limited to a Wi-Fi access point (AP), station (STA) and/or other.

In some embodiments, an apparatus of a device (including but not limited to the UE 102, eNB 104, gNB 105 and/or other) may comprise memory that is configurable to store one or more elements, and the apparatus may use them for performance of one or more operations. The apparatus may include processing circuitry, which may perform one or more operations (including but not limited to operation(s) of the method 400 and/or other methods described herein). The processing circuitry may include a baseband processor. The baseband circuitry and/or the processing circuitry may perform one or more operations described herein. The apparatus may include a transceiver to transmit and/or receive one or more blocks, messages and/or other elements.

Embodiments are not limited by references herein to transmission, reception and/or exchanging of elements such as frames, messages, requests, indicators, signals or other elements. In some embodiments, such an element may be generated, encoded or otherwise processed by processing circuitry for transmission by a transceiver or other component cases. In some embodiments, such an element may be received by a transceiver or other component, and may be decoded, detected or otherwise processed by processing circuitry. In some embodiments, the processing circuitry and the transceiver may be included in a same apparatus. In some embodiments, the transceiver may be separate from the apparatus that comprises the processing circuitry, in some embodiments.

One or more of the elements (such as messages, operations and/or other) described herein may be included in a 3GPP protocol, 3GPP LTE protocol, 4G protocol, 5G protocol, NR protocol and/or other protocol, but embodiments are not limited to usage of those elements. In some embodiments, other elements may be used, including other element(s) in a same standard/protocol, other element(s) in another standard/protocol and/or other. In addition, the scope of embodiments is not limited to usage of elements that are included in standards.

In some embodiments, the UE 102, eNB 104 and/or gNB 105 may be arranged to operate in accordance with a 3GPP protocol, NR protocol, and/or other protocol.

In descriptions herein, references are made to performance of one or more operations of the method 400 (and/or other operations) by an initiating UE 102 or by a receiving UE 102. It is understood that such references are not limiting. In some cases, such references may be used in the descriptions herein for clarity. In some embodiments, a device (including but not limited to a UE 102, a UE 102 that operates as an initiating UE 102, a UE 102 that operates as a receiving UE 102, and/or other device) may perform one or more of the operations of the method 400 and/or other operations described herein. In some embodiments, a device (including but not limited to a UE 102, a UE 102 that operates as an initiating UE 102, a UE 102 that operates as a receiving UE 102, and/or other device) may perform one or more operations that may be the same as, similar to, related to and/or reciprocal to one or more of the operations of the method 400 and/or other operations described herein.

In some embodiments, a UE 102 may be configurable to operate as an initiating UE 102 and may also be configurable to operate as a receiving UE 102. Accordingly, the UE 102 may perform one or more operations from the perspective of an initiating UE 102 and may perform one or more operations from the perspective of a receiving UE 102, in some embodiments. For instance, the UE 102 may initiate a first V2X service, and may transmit a first PC5 RAT request message (related to the first V2X service) to a first UE 102. The UE 102 may also receive, for a second V2X service, a second PC5 RAT request message (related to the second V2X service) from a second UE 102.

At operation 405, the UE 102 may exchange control signaling with one or more components of a network. In some embodiments, the UE 102 may exchange at least a portion of the control signaling with an eNB 104. In some embodiments, the UE 102 may exchange at least a portion of the control signaling with a gNB 105. Embodiments are not limited to exchanging of the control signaling with these components (eNB 104 and/or gNB 105), as the UE 102 may exchange at least a portion of the control signaling with one or more other components, in some embodiments.

At operation 410, the UE 102 may exchange additional control signaling with another UE 102. In some embodiments, operation 410 may be extended to multiple control messages and/or multiple UEs 102. For instance, the initiating UE 102 may send a control message to each of multiple receiving UEs 102, in some embodiments.

At operation 415, the UE 102 may select a PC5 RAT for a V2X service. At operation 420, the UE 102 may select a PC5 RAT to be proposed for the V2X service.

At operation 425, the UE 102 may exchange a PC5 RAT request message. In some embodiments, the UE 102 may exchange the PC5 RAT request message with another UE 102, although the scope of embodiments is not limited in this respect. In some embodiments, the initiating UE 102 may transmit a PC5 RAT request message to the receiving UE 102. In some embodiments, the receiving UE 102 may receive a PC5 RAT request message from the initiating UE 102. In some embodiments, operation 425 may be extended to multiple PC5 RAT request messages and/or multiple UEs 102. For instance, the initiating UE 102 may send a PC5 RAT request message to each of multiple receiving UEs 102, in some embodiments.

At operation 430, the UE 102 may exchange a PC5 RAT response message. In some embodiments, the UE 102 may exchange the PC5 RAT response message with another UE 102, although the scope of embodiments is not limited in this respect. In some embodiments, the initiating UE 102 may receive a PC5 RAT response message from the receiving UE 102. In some embodiments, the receiving UE 102 may transmit a PC5 RAT response message to the initiating UE 102. In some embodiments, operation 430 may be extended to multiple PC5 RAT response messages and/or multiple UEs 102. For instance, the initiating UE 102 may receive a PC5 RAT response message from each of multiple receiving UEs 102, in some embodiments.

At operation 435, the UE 102 may exchange a PC5 RAT acknowledgement (ACK) message. In some embodiments, the UE 102 may exchange the PC5 RAT ACK message with another UE 102, although the scope of embodiments is not limited in this respect. In some embodiments, the initiating UE 102 may transmit a PC5 RAT ACK message to the receiving UE 102. In some embodiments, the receiving UE 102 may receive a PC5 RAT ACK message from the initiating UE 102. In some embodiments, operation 435 may be extended to multiple PC5 RAT ACK messages and/or multiple UEs 102. For instance, the initiating UE 102 may transmit a PC5 RAT ACK message to each of multiple receiving UEs 102, in some embodiments.

At operation 440, the UE 102 may exchange data message(s) as part of the V2X service. In some embodiments, the UE 102 may exchange the data message(s) with another UE 102, although the scope of embodiments is not limited in this respect. The exchange of data message(s) may include transmission of data message(s) and/or reception of data message(s). In some embodiments, the initiating UE 102 may transmit data message(s) to the receiving UE 102. In some embodiments, the initiating UE 102 may receive data message(s) from the receiving UE 102. In some embodiments, the receiving UE 102 may transmit data message(s) to the initiating UE 102. In some embodiments, the receiving UE 102 may receive data message(s) from the initiating UE 102. In some embodiments, operation 440 may be extended to multiple data messages and/or multiple UEs 102. For instance, the initiating UE 102 may transmit a data message to each of multiple receiving UEs 102, in some embodiments.

Embodiments are not limited to usage of messages such as the PC5 RAT request message, PC5 RAT response message, PC5 RAT ACK message and/or other. In some embodiments, one or more other messages may be used in operations described herein (including, but not limited to, operations of the method 400).

In some embodiments, the UE 102 may be configurable to operate as an initiating UE 102 for a V2X application. In some embodiments, the V2X application may include PC5 communication between the initiating UE 102 and one or more receiving UEs 102. In some embodiments, the initiating UE 102 may receive, from a base station (such as the eNB 104, gNB 105 and/or other), control signaling that indicates a default PC5 RAT for the V2X service. In some embodiments, a PC5 RAT described as part of the method 400 (such as the default PC5 RAT, proposed PC5 RAT, selected PC5 RAT and/or other PC5 RAT) may be either a Long Term Evolution (LTE) PC5 RAT or a New Radio (NR) PC5 RAT, although the scope of embodiments is not limited in this respect. One or more other PC5 RATs may be used, in some embodiments.

In some embodiments, the initiating UE 102 may select either the LTE PC5 RAT or the NR PC5 RAT to be proposed, in a negotiation with the receiving UE 102, for the V2X service. In some embodiments, the initiating UE 102 may, if the initiating UE 102 supports at least the default PC5 RAT, select the default PC5 RAT. In some embodiments, the initiating UE 102 may, if the initiating UE 102 does not support the default PC5 RAT, perform one or more of: select (from the LTE PC5 RAT and the NR PC5 RAT) the PC5 RAT that is supported by the initiating UE 102; transmit, to the receiving UE 102, a PC5 RAT request message to initiate the V2X service; and/or other. In some embodiments, the PC5 RAT request message may indicate the selected PC5 RAT and/or other information.

In some embodiments, the initiating UE 102 may receive, from the receiving UE 102, a PC5 RAT response message that indicates which PC5 RAT, of the LTE PC5 RAT and the NR PC5 RAT, was selected by the receiving UE 102 for the V2X service. In some embodiments, the initiating UE 102 may transmit, to the receiving UE 102, a PC5 RAT acknowledgement (ACK) message to indicate reception of the PC5 RAT response message.

In some embodiments, the initiating UE 102 may transmit, to the receiving UE 102, a data message for the V2X service. In some embodiments, the initiating UE 102 may encode the data message in accordance with the PC5 RAT indicated in the PC5 RAT response message.

In some embodiments, the initiating UE 102 may, if the initiating UE 102 supports the PC5 RAT indicated in the PC5 RAT response message: use the PC5 RAT indicated in the PC5 RAT response message as the PC5 RAT for the V2X service. In some embodiments, the initiating UE 102 may, if the initiating UE 102 does not support the PC5 RAT indicated in the PC5 RAT response message: transmit additional control signaling to the receiving UE 102 to indicate that the initiating UE 102 does not support the PC5 RAT indicated in the PC5 RAT response message.

In some embodiments, the initiating UE 102 may use the PC5 RAT indicated in the PC5 RAT response message for the V2X service. In some embodiments, the initiating UE 102 may, if a second receiving UE 102 is to be included in the V2X service after the V2X service is initiated, and if the second receiving UE 102 does not support the PC5 RAT indicated in the PC5 RAT response message: transmit additional control signaling to re-negotiate the PC5 RAT to be used for the V2X service.

In some embodiments, the initiating UE 102 may encode the PC5 RAT request message to indicate one or more of: whether the initiating UE 102 supports the LTE PC5 RAT; whether the initiating UE 102 supports the NR PC5 RAT; and/or other information/parameters.

In some embodiments, the control signaling from the base station may include one or more parameters related to PC5 Transmit (TX) profiles for V2X services.

In some embodiments, the initiating UE 102 may encode the PC5 RAT request message to include an identifier of the V2X service. In some embodiments, the identifier may be an intelligent transport systems application identifier (ITS-AID), a provider service identifier (PSID) and/or other.

In some embodiments, the control signaling that indicates the default PC5 RAT for the V2X service may be received from: an eNB 104 of a Third Generation Partnership Project (3GPP) LTE network, a gNB 105 of an NR network, and/or other. Accordingly, the base station from which the control signaling is received may be an eNB 104 of a 3GPP LTE network, a gNB 105 of an NR network, and/or other, in some embodiments.

In some embodiments, the control signaling received from the base station may include the default PC5 RAT to enable a phased deployment of LTE PC5 communication and NR PC5 communication, wherein the default PC5 RAT is the LTE PC5 RAT during a first phase, wherein the default PC5 RAT is the NR PC5 RAT during a second phase that follows the first phase. For instance, a phased deployment may be used, wherein the default PC5 RAT is the LTE PC5 RAT during a first phase, wherein the default PC5 RAT is the NR PC5 RAT during a second phase that follows the first phase.

In some embodiments, the initiating UE 102 may receive, from a base station, control signaling that indicates a default PC5 RAT for the V2X service. In some embodiments, the default PC5 RAT may be either an LTE PC5 RAT or an NR PC5 RAT, although the scope of embodiments is not limited in this respect. In some embodiments, the initiating UE 102 may transmit, to the receiving UE 102, first signaling that requests information related to PC5 RATs supported by the receiving UE 102. In some embodiments, the initiating UE 102 may receive, from the receiving UE 102, second signaling that indicates one or more PC5 RATs supported by the receiving UE 102. In some embodiments, the initiating UE 102 may select either the LTE PC5 RAT or the NR PC5 RAT to be proposed, in a negotiation with the receiving UE 102, for usage in the V2X service. In some embodiments, the selection may be based on one or more of: the default PC5 RAT, one or more PC5 RATs supported by the initiating UE 102, the one or more PC5 RATs supported by the receiving UE 102, and/or other.

In some embodiments, the initiating UE 102 may, if the initiating UE 102 and the receiving UE 102 support the default PC5 RAT, select the default PC5 RAT. In some embodiments, the initiating UE 102 may, if the initiating UE 102 does not support the default PC5 RAT or if the receiving UE 102 does not support the default PC5 RAT, and if one of the PC5 RATs (of the LTE PC5 RAT and the NR PC5 RAT) is supported by both the initiating UE 102 and the receiving UE 102: select the PC5 RAT supported by both the initiating UE 102 and the receiving UE 102. In some embodiments, the initiating UE 102 may transmit, to the receiving UE 102 as part of the negotiation, a PC5 RAT request message that proposes the selected PC5 RAT for usage in the V2X service. In some embodiments, the initiating UE 102 may receive, from the receiving UE 102, a PC5 RAT response message that indicates whether the receiving UE 102 accepts the proposed PC5 RAT for usage in the V2X service. It is noted that transmission/reception of messages (such as the PC5 RAT request message, PC5 RAT response message, PC5 RAT ACK message and/or other) may be part of a negotiation in some embodiments, although the scope of embodiments is not limited in this respect.

In some embodiments, the UE 102 may be configurable to operate as a receiving UE 102 for a V2X application. In some embodiments, the V2X application may include PC5 communication between the receiving UE 102 and an initiating UE 102. In some embodiments, the receiving UE 102 may receive, from the initiating UE 102, control signaling that indicates one or more of: A) a proposed PC5 RAT for the V2X service, and B) one or more PC5 RATs supported by the initiating UE 102; and/or other. In some embodiments, a PC5 RAT (such as the proposed PC5 RAT and/or supported PC5 RATs) may be either the LTE PC5 RAT or the NR PC5 RAT, although the scope of embodiments is not limited in this respect. In some embodiments, the receiving UE 102 may select either the LTE PC5 RAT or the NR PC5 RAT for the V2X service. In some embodiments, the receiving UE 102 may, if the receiving UE 102 supports the proposed PC5 RAT, select the proposed PC5 RAT. In some embodiments, the receiving UE 102 may, if the receiving UE 102 does not support the proposed PC5 RAT, and if at least one of the PC5 RATs (of the LTE PC5 RAT and the NR PC5 RAT) is supported by both the initiating UE 102 and the receiving UE 102: select the PC5 RAT that is supported by both the initiating UE 102 and the receiving UE 102.

In some embodiments, the receiving UE 102 may transmit, to the initiating UE 102, a PC5 RAT response message that indicates the PC5 RAT selected by the receiving UE 102 for the V2X service.

In some embodiments, the receiving UE 102 may transmit, to the initiating UE 102, a data message for the V2X service. In some embodiments, the receiving UE 102 may encode the data message in accordance with the PC5 RAT selected by the receiving UE 102.

In some embodiments, the receiving UE 102 may, if the receiving UE 102 does not support the proposed PC5 RAT, and if the receiving UE 102 does not support any of the PC5 RATs supported by the initiating UE 102: refrain from selection of the PC5 RAT for the V2X service; transmit, to the initiating UE 102, a PC5 RAT response message that indicates that the receiving UE 102 did not select the PC5 RAT for the V2X service; and/or other.

It should be noted that descriptions herein may refer to sidelink communication, V2V communication, V2X communication, but the scope of embodiments is not limited in this respect. For instance, descriptions herein may refer to one or more techniques, operations, and/or methods that include sidelink communication, V2V communication, and/or V2X communication. It is understood that one or more of those techniques, operations, and/or methods may include one or more of: direct communication between mobile devices, device-to-device (D2D) communication, off-network communication, communication between two devices that may not necessarily include communication with a network, and/or other communication.

Figure 5:
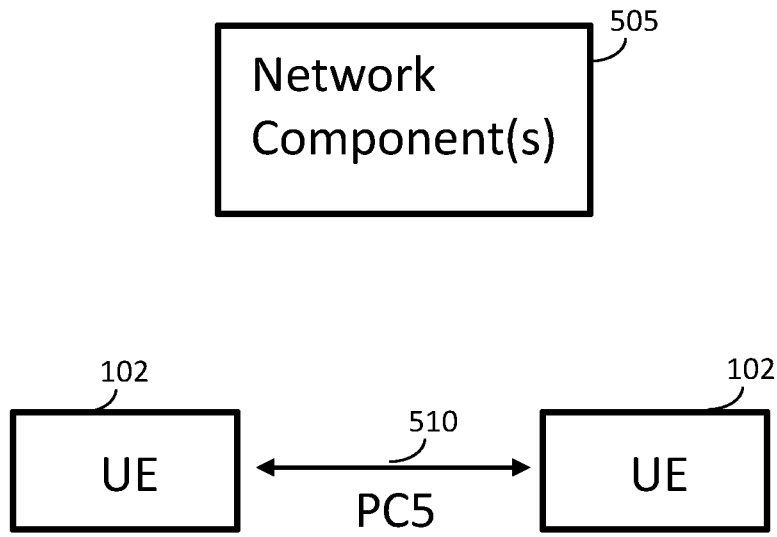
FIG. 5 illustrates an example scenario in accordance with some embodiments.
Figure 6:
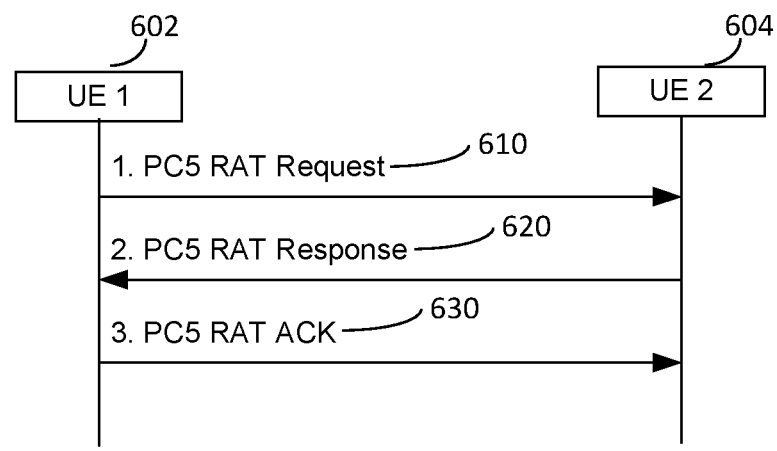
FIG. 6 illustrates example messages that may be exchanged in accordance with some embodiments.

FIG. 5 illustrates an example scenario in accordance with some embodiments. FIG. 6 illustrates example messages that may be exchanged in accordance with some embodiments. It should be noted that the examples shown in FIGS. 5-6 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 5-6. Although some of the elements shown in the examples of FIGS. 5-6 may be included in a 3GPP standard, NR standard, 5G standard and/or other standard, embodiments are not limited to usage of such elements that are included in standards.

In the scenario 500, the UEs 102 may communicate over a PC5 interface (as indicated by 510). In some embodiments, such communication may be in accordance with V2V, V2X, eV2X, sidelink, D2D, and/or other, although the scope of embodiments is not limited in this respect. In addition, one or more of the UEs 102 may exchange control signaling with one or more components of one or more networks (indicated by 505 in FIG. 5). One or more of the techniques, operations and/or methods described herein may be performed in accordance with the scenario 500 and/or similar scenario, although the scope of embodiments is not limited in this respect.

In FIG. 6, the UEs 602, 604 may exchange messages (including but not limited to one or more of 610, 620, 630). In a non-limiting example, the UE1 (indicated by 602) may be an initiating UE 102 and the UE2 (indicated by 604) may be a receiving UE 102. Some embodiments may not necessarily include exchanging of all of the messages 610, 620, 630. In some embodiments, one or more messages not shown in FIG. 6 may be exchanged between UE1 602 and UE2 604.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A user equipment device (UE), comprising:
at least one antenna;
radio circuitry, wherein the radio circuitry is configured to perform cellular communication using at least one radio access technology (RAT); and
processing circuitry coupled to the radio circuitry, wherein the processing circuitry is configured to cause the UE to:
decode, from a base station, control signaling that indicates a default PC5 radio access technology (RAT) for a vehicle-to-everything (V2X) service, wherein the default PC5 RAT is either a Long Term Evolution (LTE) PC5 RAT or a New Radio (NR) PC5 RAT;
select the LTE PC5 RAT or the NR PC5 RAT to be proposed, in a negotiation with a receiving UE, for the V2X service, wherein, if the UE supports at least the default PC5 RAT, select the default PC5 RAT, and wherein, if the UE does not support the default PC5 RAT, select the PC5 RAT that is supported by the UE;
encode, for transmission to the receiving UE, a PC5 RAT request message to initiate the V2X service, wherein the PC5 RAT request message indicates the selected PC5 RAT;
decode, from the receiving UE, a PC5 RAT response message that indicates which PC5 RAT, of the LTE PC5 RAT and the NR PC5 RAT, was selected by the receiving UE for the V2X service; and
encode, for transmission to the receiving UE, a PC5 RAT acknowledgement (ACK) message to indicate reception of the PC5 RAT response message.

2. The UE of claim 1,
wherein the processing circuitry is further configured to cause the UE to:
encode, for transmission the receiving UE, a data message for the V2X service, wherein the data message is encoded in accordance with the PC5 RAT indicated in the PC5 RAT response message.

3. The UE of claim 1,
wherein the processing circuitry is further configured to cause the UE to:
if the UE supports the PC5 RAT indicated in the PC5 RAT response message, use the PC5 RAT indicated in the PC5 RAT response message as the PC5 RAT for the V2X service; and
if the UE does not support the PC5 RAT indicated in the PC5 RAT response message, encode additional control signaling for transmission to the receiving UE to indicate that the UE does not support the PC5 RAT indicated in the PC5 RAT response message.

4. The UE of claim 1,
wherein the receiving UE is a first receiving UE, and wherein the processing circuitry is further configured to cause the UE to:
use the PC5 RAT indicated in the PC5 RAT response message for the V2X service; and
if a second receiving UE is to be included in the V2X service after the V2X service is initiated, and if the second receiving UE does not support the PC5 RAT indicated in the PC5 RAT response message, encode additional control signaling to re-negotiate the PC5 RAT to be used for the V2X service.

5. The UE of claim 1,
wherein the processing circuitry is further configured to cause the UE to:
encode the PC5 RAT request message to indicate whether the UE supports the LTE PC5 RAT and whether the UE supports the NR PC5 RAT.

6. The UE of claim 1,
wherein the control signaling further includes one or more parameters related to PC5 Transmit (TX) profiles for V2X services.

7. The UE of claim 1,
wherein the processing circuitry is further configured to cause the UE to:
encode the PC5 RAT request message to include an identifier of the V2X service.

8. The UE of claim 7,
wherein the identifier is an intelligent transport systems application identifier (ITS-AID) or a provider service identifier (PSID).

9. An apparatus, comprising:
a memory; and
processing circuitry in communication with the memory, wherein the processing circuitry is configured to:
decode, from an initiating user equipment device (UE), control signaling that indicates a proposed PC5 radio access technology (RAT) for a vehicle-to-everything (V2X) service, wherein the proposed PC5 RAT is either a Long Term Evolution (LTE) PC5 RAT or a New Radio (NR) PC5 RAT and one or more PC5 RATs supported by the initiating UE; and
select one of the LTE PC5 RAT or the NR PC5 RAT for the V2X service, wherein if the proposed PC5 RAT is supported, the proposed PC5 RAT is selected, and wherein if the proposed PC 5 RAT is not supported, if at least one of the PC5 RATs is supported by the initiating UE and the apparatus, select the PC5 RAT that is supported by both the initiating UE and the apparatus;
encode, from transmission to the initiating UE, a PC5 RAT response message that indicates which PC5 RAT, of the LTE PC5 RAT and the NR PC5 RAT, was selected for the V2X service; and decode, from the initiating UE, a PC5 RAT acknowledgement (ACK) message to indicate reception of the PC5 RAT response message.

10. The apparatus of claim 9,
wherein the processing circuitry is further configured to:
encode, for transmission to the initiating UE, a data message for the V2X service, wherein the data message is encoded in accordance with the PC5 RAT selected for the V2X service.

11. The apparatus of claim 9,
wherein the processing circuitry is further configured to:
if the proposed PC5 RAT is not supports and if the apparatus does not support any of the PC5 RATs supported by the initiating UE, refrain from selection of the PC5 RAT for the V2X service; and
encode, for transmission to the initiating UE, a PC5 RAT response message that indicates that a PC5 RAT for the V2X service was not selected.

12. The apparatus of claim 9,
wherein the control signaling further includes one or more parameters related to PC5 Transmit (TX) profiles for V2X services.

13. The apparatus of claim 9,
wherein the processing circuitry is further configured to cause the UE to:
decode, from the initiating UE, a PC5 RAT request message that includes an identifier of the V2X service.

14. The apparatus of claim 13,
wherein the identifier is an intelligent transport systems application identifier (ITS-AID) or a provider service identifier (PSID).

15. A method for communication, comprising:
a user equipment device (UE),
decoding, from a base station, control signaling that indicates a default PC5 radio access technology (RAT) for a vehicle-to-everything (V2X) service, wherein the default PC5 RAT is either a Long Term Evolution (LTE) PC5 RAT or a New Radio (NR) PC5 RAT;
selecting the LTE PC5 RAT or the NR PC5 RAT to be proposed, in a negotiation with a receiving UE, for the V2X service, wherein, if the UE supports at least the default PC5 RAT, select the default PC5 RAT, and wherein, if the UE does not support the default PC5 RAT, select the PC5 RAT that is supported by the UE;
encoding, for transmission to the receiving UE, a PC5 RAT request message to initiate the V2X service, wherein the PC5 RAT request message indicates the selected PC5 RAT;
decode, from the receiving UE, a PC5 RAT response message that indicates which PC5 RAT, of the LTE PC5 RAT and the NR PC5 RAT, was selected by the receiving UE for the V2X service; and
encode, for transmission to the receiving UE, a PC5 RAT acknowledgement (ACK) message to indicate reception of the PC5 RAT response message.

16. The method of claim 15, further comprising:
the UE,
encoding, for transmission the receiving UE, a data message for the V2X service, wherein the data message is encoded in accordance with the PC5 RAT indicated in the PC5 RAT response message.

17. The method of claim 15, further comprising:
the UE,
- if the UE supports the PC5 RAT indicated in the PC5 RAT response message, using the PC5 RAT indicated in the PC5 RAT response message as the PC5 RAT for the V2X service; and
- if the UE does not support the PC5 RAT indicated in the PC5 RAT response message, encoding additional control signaling for transmission to the receiving UE to indicate that the UE does not support the PC5 RAT indicated in the PC5 RAT response message.

18. The method of claim 15,
wherein the control signaling further includes one or more parameters related to PC5 Transmit (TX) profiles for V2X services.

19. The method of claim 15, further comprising:
the UE,
- encoding the PC5 RAT request message to include an identifier of the V2X service.

20. The method of claim 19,
wherein the identifier is an intelligent transport systems application identifier (ITS-AID) or a provider service identifier (PSID).

\* \* \* \* \*